(12) United States Patent
Flick et al.

(10) Patent No.: US 6,648,292 B2
(45) Date of Patent: *Nov. 18, 2003

(54) LONGITUDINAL SEAT ADJUSTMENT SYSTEM

(75) Inventors: Joachim Flick, Hückeswagen (DE); Michael Borbe, Rheinbach (DE); Bernd Gross, Langenfeld (DE); Wolfgang Klahold, Herne (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/149,479
(22) PCT Filed: Aug. 16, 2001
(86) PCT No.: PCT/EP01/09417
§ 371 (c)(1), (2), (4) Date: Jun. 11, 2002
(87) PCT Pub. No.: WO02/32717
PCT Pub. Date: Apr. 25, 2002

(65) Prior Publication Data
US 2002/0190182 A1 Dec. 19, 2002

(30) Foreign Application Priority Data
Oct. 13, 2000 (DE) .......................... 100 50 959

(51) Int. Cl.⁷ .............................................. F16N 13/00
(52) U.S. Cl. ................................... 248/430; 297/344.1
(58) Field of Search ................................ 248/900, 429, 248/430, 424; 297/341, 344.1

(56) References Cited

U.S. PATENT DOCUMENTS

| | | | | |
|---|---|---|---|---|
| 3,631,740 A | | 1/1972 | Gavagan ................. 248/430 |
| D336,120 S | * | 6/1993 | Knudsen .................. D21/500 |
| 5,407,165 A | * | 4/1995 | Balocke .................. 248/429 |
| 6,036,267 A | * | 3/2000 | Downey et al. ........... 297/341 |
| 6,098,946 A | * | 8/2000 | Sechet et al. ............ 248/424 |
| 6,113,051 A | * | 9/2000 | Moradell et al. ......... 248/430 |
| 6,126,133 A | * | 10/2000 | Timon et al. ............ 248/429 |

FOREIGN PATENT DOCUMENTS

| | | |
|---|---|---|
| DE | 3042379 | 6/1982 |
| DE | 196 13 506 A1 | 10/1997 |
| DE | 197 09 149 A1 | 9/1998 |
| EP | 0842808 | 5/1998 |
| FR | 2759330 | 8/1998 |

* cited by examiner

*Primary Examiner*—Kimberly Wood
*Assistant Examiner*—A. Joseph Wujciak, III
(74) *Attorney, Agent, or Firm*—Friedrich Kueffner

(57) ABSTRACT

The invention relates to a longitudinal seat adjustment system for seats, comprising two pairs of rails (10) which are set apart from each other. Said pairs of rails each consist of two U-shaped rails, an upper rail (11) and a lower rail (12). These two rails (11, 12) can be switched to a locking position or a release position by means of at least one spring-loaded, plate-shaped locking part (21). Said locking part (21) has teeth (15) on two opposite sides, these teeth engaging in recesses (14) or openings (16) in the rails. According to the invention, the edge areas (44) of the tooth-like recesses (14) in the lower rail (12) and/or the edge areas (45) of the slit-like openings (16) in the upper rail (11) are permanently deformable. Consequently, in the locking position, the teeth (15) of the plate-shaped locking part (21) which engage in the openings (16) and recesses (14) deform the edge areas of said opening (16) or recesses (14) in the event of a considerable load, for example in an accident.

10 Claims, 4 Drawing Sheets

LONGITUDINAL SEAT ADJUSTMENT SYSTEM

BACKGROUND OF THE INVENTION

The invention pertains to a longitudinal seat adjustment, especially for vehicle seats, with two pairs of rails, spaced a certain distance apart, namely, an upper rail facing the seat and a lower rail facing the floor of the vehicle; with U-shaped sections on the sidepieces of the two rails, extending in the longitudinal direction, the sections on the lower rail lying in the interior of the rail, whereas those on the upper rail lie outside the U-shaped rail; and with at least one spring-loaded, movable, plate-shaped locking part, which is supported on the upper rail and which, when in the locking position, prevents the upper rail from moving in the lower rail. The exposed edges of the U-shaped sections of the U-shaped lower rail are provided with tooth-like slots, whereas the U-shaped upper rail carries slit-like openings on the sidepieces with the U-shaped sections, into which openings the teeth of the locking part engage, where the locking part can be moved against the force of a spring from a locking position to a released position by the use of an operating element.

A similar form of this type of longitudinal seat adjustment is described in the unpublished Patent Application No. 100 41 605.5 of Aug. 24, 2000.

SUMMARY OF THE INVENTION

The task of the invention is to design a longitudinal seat adjustment of the type indicated above in such a way that the peaks of impact-like loads are reduced, so that the person sitting on the seat is protected. The arrangement is also intended to be as simple in design as possible.

This task is accomplished according to the invention in that the edge areas of the tooth-like slots of the lower rail and/or the edge areas of the slit-like openings in the upper rail are designed to be plastifiable, that is, permanently deformable. Here the teeth of the locking part engaging in the openings and in the slots when in the locking position deform the edge areas when a heavy, impact-like load occurs.

Because the edge areas are designed to be deformable or plastifiable, excessive load peaks are reduced. Nevertheless, the pair of rails and the seat, of the motor vehicle are held securely in place. It is recommended that the controlled deformation of the edge areas be accomplished through a perforation of the sidepiece walls of the rails provided with the slots and/or openings. As a result, the rail remains sufficiently strong in spite of the perforation, whereas the perforation has the effect of allowing the edge areas to give way to such an extent that load peaks are reduced; additional locking parts, furthermore, arrive in the path of the forces. A design such as this does not increase the cost of installation.

In a special exemplary embodiment of the invention, a receiving space is provided on each side of the slit-like openings or slots in the rail; the deformed edge areas are thus able to escape into these spaces. This measure means that, when deformation occurs, it can occur over a longer distance and also that, even though the seat is still being held securely, load peaks can continue to be reduced.

Depending on the design, these receiving spaces can be in the form of slots or hourglasses. In another exemplary embodiment, they have at least one transverse web in order to give support to the two adjacent edge areas in the receiving space, as a result of which the forces are transmitted and absorbed more effectively. In another exemplary embodiment, the receiving space is divided by a diagonal web. This diagonal web again allows the deformed areas to be received reliably. The plastifying area can also consist of at least one separate component of different material.

In a special exemplary embodiment, the locking part is divided into at least three individual plates, each of which is equipped with locking teeth on two opposite sides. The individual locking plates make it possible for the locking position to be established securely but also ensures a reliable transmission of force when loads are applied. In a special exemplary embodiment, at least two locking plates, when in their locking position, lie simultaneously in the path of the forces flowing through the upper rail to absorb those forces, so that, as a result of the plastifying effect which occurs under a heavy, impact-like load, the contact angles of the plates with the edge areas undergo hardly any change. This arrangement makes it possible, when the plastifying effect occurs, for the plates themselves to remain in their position and to resist being moved concomitantly, even though the edge areas of the openings in the upper rail, into which the teeth of the locking parts engage, are deformable. The locking plates can hold the seat in its locked position. Because the contact angle does change or changes only slightly, there is also no danger that one or more of the individual plates or all of the plates will become disengaged.

In another exemplary embodiment of the invention, the width of the tooth-like slot in the lower rail is greater than the width of the slit-like opening in the upper rail. If the locking part is divided into at least three separate, movable plates, the teeth of at least two of these plates will be engaged, when in the locking position, with the slots and openings in the rails; in this case, the width of the slit-like openings in the upper rail is the same as the width of the teeth on the locking plate.

As a result of this measure, an almost infinitely variable adjustment of the upper and lower rails with respect to each other is possible. In addition, it is ensured that at least two plates will be in engagement with the lower rail when the locking part is in the locking position. Crash-like loads can thus be efficiently absorbed.

BRIEF DESCRIPTION OF THE DRAWINGS

The object of the invention is illustrated in the drawing on the basis of several exemplary embodiments.

DESCRIPTION OF PREFERRED EMBODIMENTS

Figure 1:
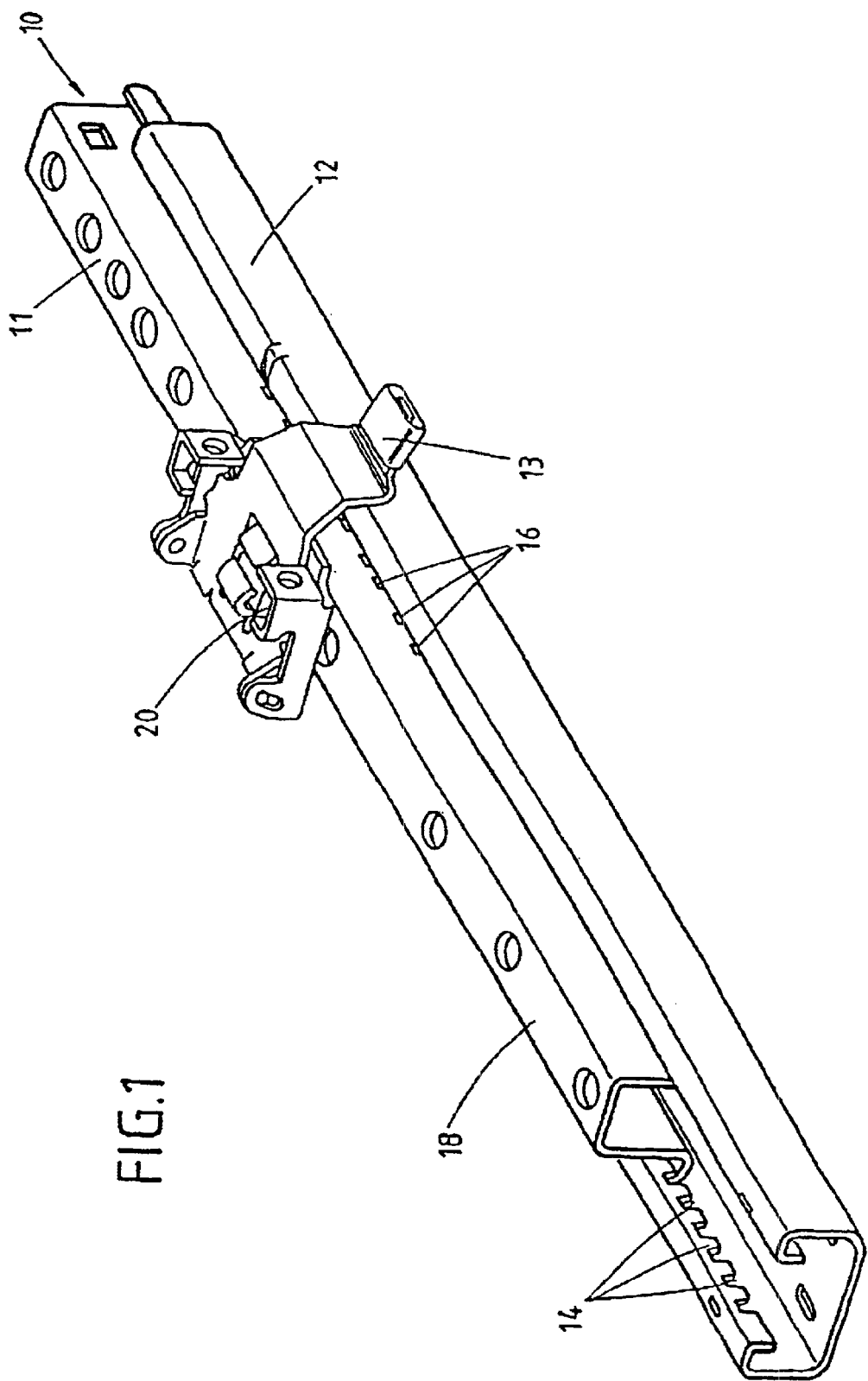
FIG. 1 shows a perspective view of a pair of rails of the longitudinal seat adjustment.
Figure 1B:
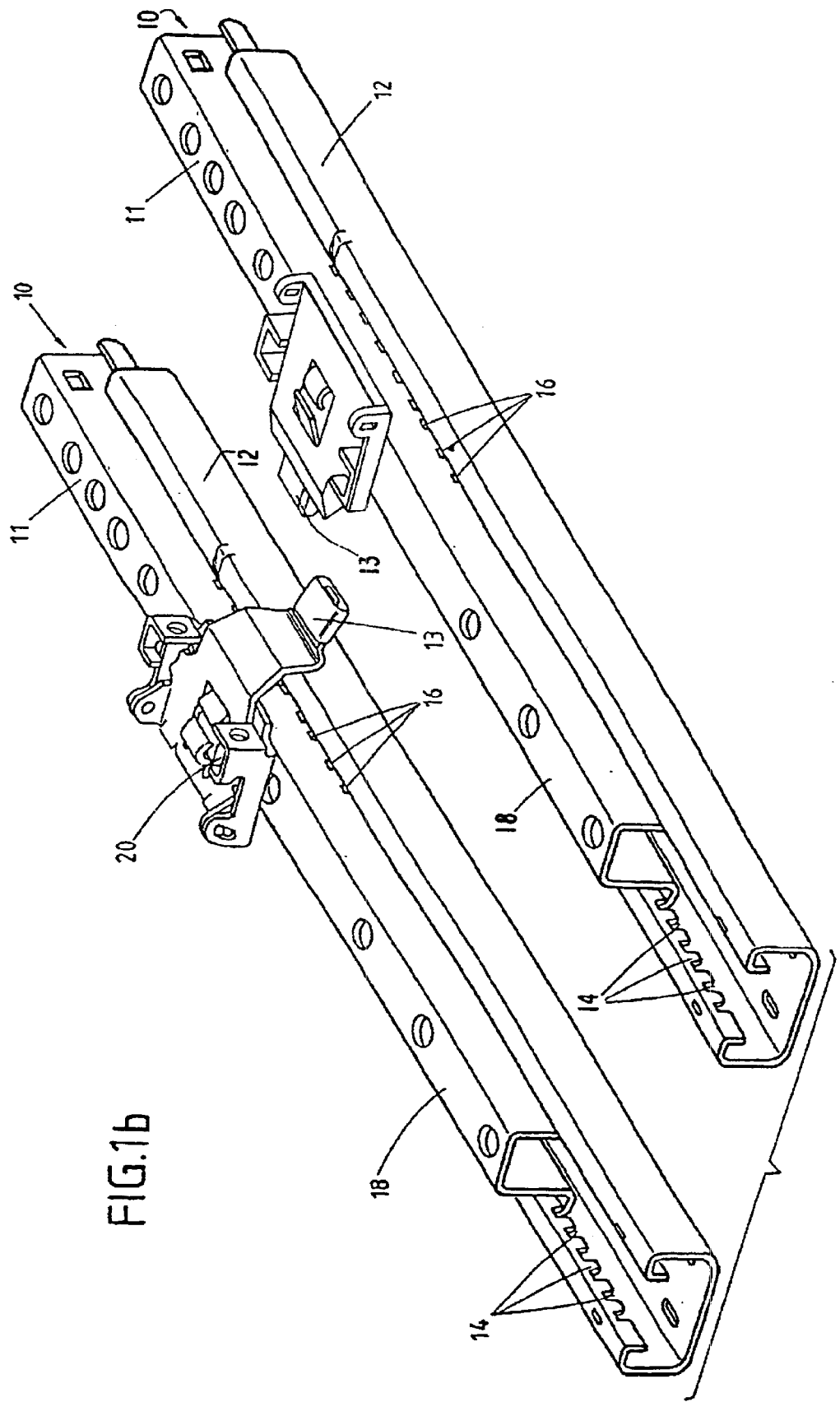

FIG. 1b shows a perspective view of two pairs of rails of the longitudinal seat adjustment;

The seat adjustment according to the invention consists of two pairs 10 of rails, spaced a certain distance apart, each of which consists of an upper rail 11 and a lower rail 12. The upper rail 11 is able to shift with respect to the lower rail 12 by rolling over balls 33. The lower rail 12 can be attached to the floor of a vehicle, whereas the upper rail 11 belongs to the frame of the seat. The profiles of the upper and lower rails 11, 12 are U-shaped; the free ends of the sidepieces are bent over again and deformed in such a way that the upper rail has two additional sections in the form of U-shaped parts 40, which are open toward the outside and the top, whereas the lower rail 12 has two additional U-shaped bent sections 41 in the form of U-shaped parts 41, which face inward and down. These two sections fit into in each other, as can be seen by way of example in FIGS. 1 and 2. To prevent the two rails 11, 12 from moving with respect to each other and thus to prevent the seat from shifting, the lower rail is provided with tooth-like slots 14. Teeth 15 of a locking part 21 engage in these slots.

So that the locking part 21 can move with the tooth-like slots, slits 16 are provided in both sidepieces of the upper rail, extending as far as the second bent section. The teeth 15 of the locking part can pass a certain distance through these slits.

The locking part 21 is provided with a guide 23. This guide passes through an opening 22 in the center web 18 of the U-shaped upper rail 11, so that one end 20 of the guide 23 projects to a certain extent out of the center web. The operating element 13 acts on this projecting end in a manner known in and of itself.

In the released position, that is, in the position in which the two rails 10, 11 and thus the seat can be moved relative to the floor of the vehicle, the guide 23 has been moved a certain distance into the interior of the rail 11. As a result, the teeth 15 of the locking part 21 become disengaged from the tooth-like slots 14 on the lower rail 12. In the exemplary embodiments shown here, the locking part 21 comprises three individual plates 21. These individual plates are arranged in accordance with the vernier principle; that is, to block the movement of the upper rail 11, at least one locking plate 21 must engage in the tooth-like slots 14 of the lower rail. Thus the seat can be adjusted in a finely graduated manner.

Figure 4:
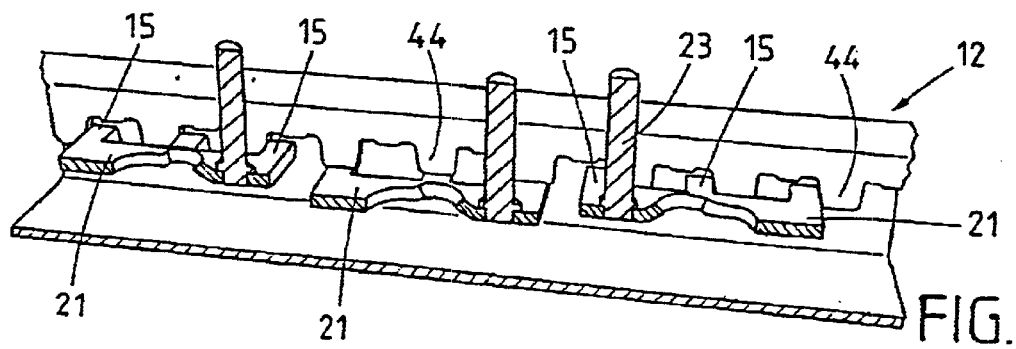
FIG. 4 shows a perspective view of the lower rail and of the locking part in cross section.

The width of the tooth-like slots, however, is usually calculated in such a way that, in the normal case, the teeth of two plates will be in engagement, as shown by way of example in FIG. 4.

Figure 2:
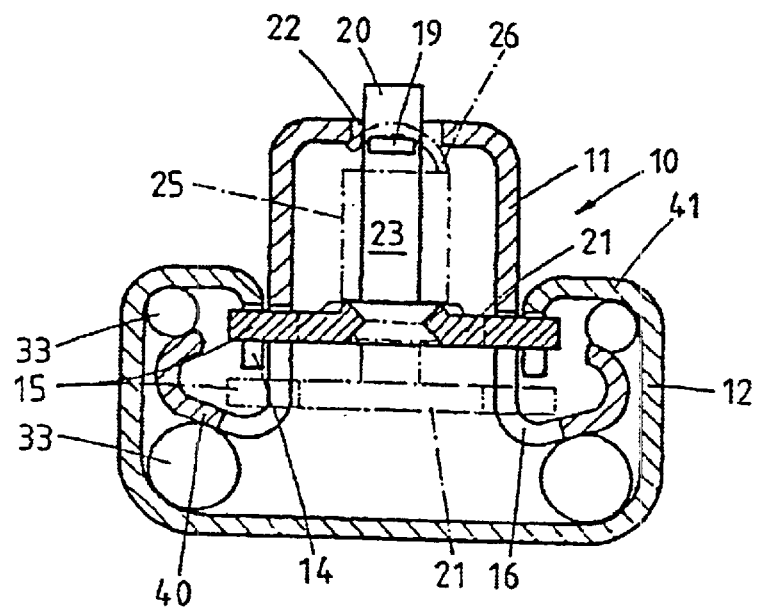
FIG. 2 shows a cross section through the pair of rails.

As is especially clear from FIG. 2, the upper rail 11 has a bent section 19. The hook-shaped end 26 of a restoring spring 25 is hooked onto this bent part. It should be pointed out here again that the guide 23, in the exemplary embodiment shown, is designed in the form of a pin and is attached to the locking part, i.e., to the locking plate.

It also should be added that the second end of the spring 25, that is, the bottom end, is attached to the locking plate 21. As a result, the locking part is always pulled against the upper rail unless this is prevented by the tooth-like webs between the tooth-like slots 14.

It also remains to be added that, in the diagram of FIG. 2, the released position of the locking part 21 is shown in broken line; that is, the teeth 15 are no longer in engagement with the tooth-like slots 14. The end 20 of the pin-shaped guide 23 projects out of the upper rail.

Figure 3:
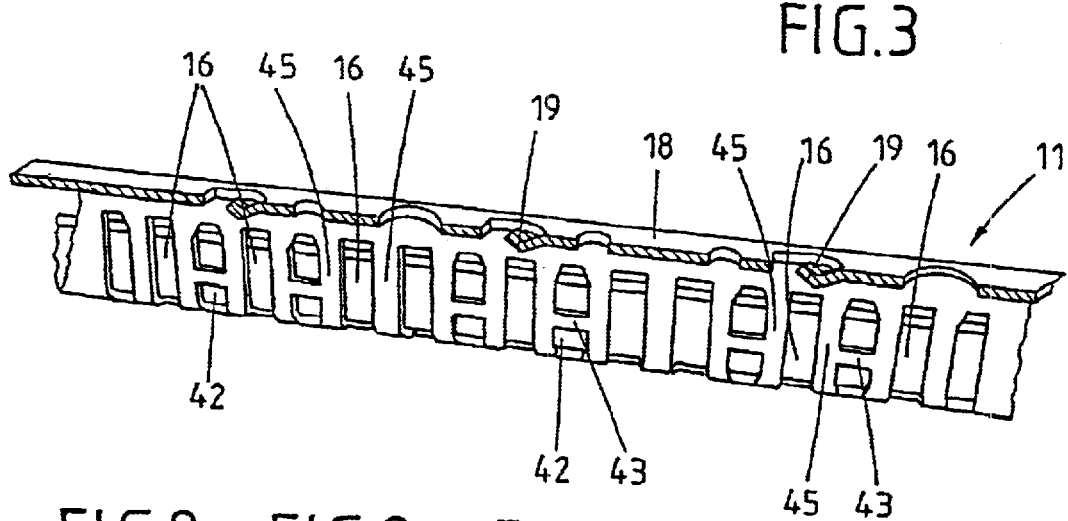
FIG. 3 shows a perspective view of the upper rail in cross section.

FIG. 3 shows a perspective view of half of an upper rail 11. The cross section extends along the center web 18. In the sidepiece, slit-like openings 16 can be seen, which serve to guide the teeth of the locking part and which also are intended to block the movement of the upper rail when the teeth of the locking part engage in the tooth-like slots 14 of the lower rail. A bent section 19 is provided in the center web 18 to hold one end of the spring 25, and the openings 22 are also shown, through which the pin-shaped guides 23 project.

Between each pair of slit-like openings 16 there is a receiving space 42. The receiving space 42 is divided by a transverse web 43, the meaning of which will be described below.

FIG. 4 shows half of a lower rail 12. The three plate-shaped parts of the locking element 21 are also shown. The teeth 15 of the locking parts 21 engage in the tooth-like slots 14 in the sidepieces of the lower rail. In addition, each locking plate 21 carries a guide 23.

As can be seen in the drawing, two of the three locking plates are engaged with the tooth-like slots, whereas the middle locking plate is located underneath the slots. The teeth of the locking plate on the left rest against the left edges of the tooth-like slots 14, whereas the teeth of the locking plate on the right rest against the right edges of the tooth-like slots.

If the plates were to be shifted by half the width of a tooth, for example, the teeth of the first and the second locking plates would then engage in the slots 14.

Figure 5:
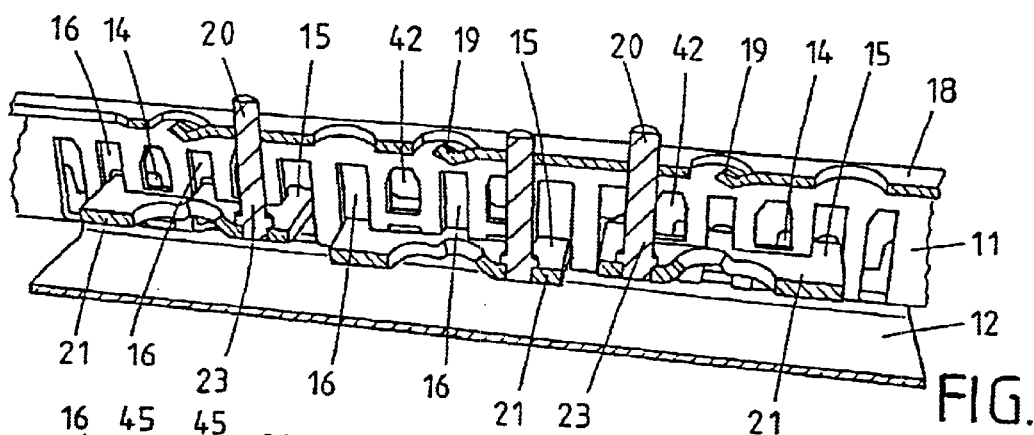
FIG. 5 shows a perspective view of the upper rail, the lower rail, and the locking part in cross section.

FIG. 5 shows a longitudinal section and a perspective view of the lower and upper rails after they have been assembled. The lower rail and the locking plates are arranged in the same way as that shown in FIG. 4, and with the tooth-like slots in the lower rail. Although the teeth of the middle locking plate 21 pass through the slit-like openings, they are underneath the slots as in FIG. 4. It should also be explained here that the springs for restoring the plates are not shown.

Figure 6:
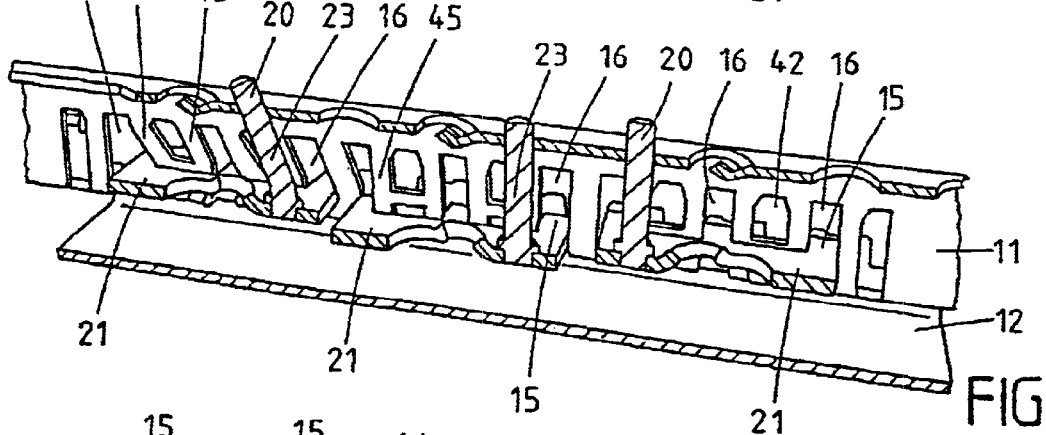
FIG. 6 shows a perspective view of the upper rail, the lower rail, and the locking part in cross section.

In the exemplary embodiment according to FIG. 6, the deformation of the rail after a crash is shown. It is assumed that a severe impact has come from the right side; that is, the vehicle seat and thus the rail have undergone forces of acceleration toward the left.

Figure 7:
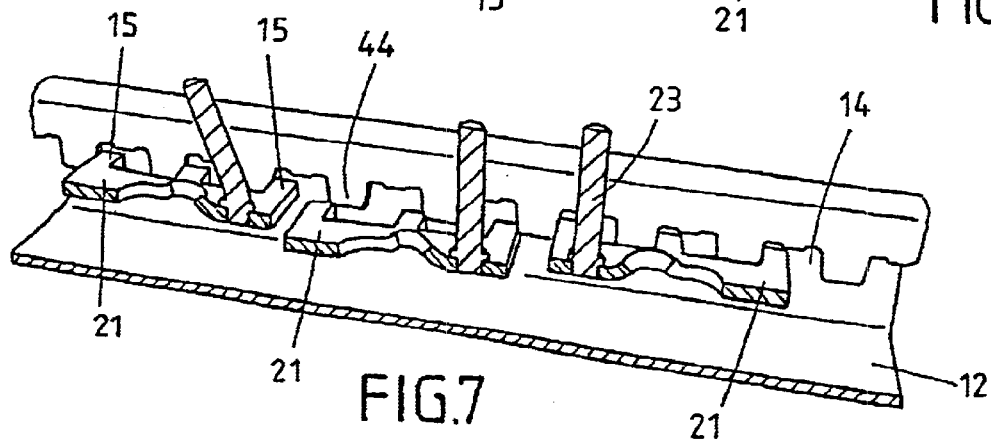
FIG. 7 shows a perspective view of the lower rail and the locking part in cross section after a crash.

As a result, the locking plate 21 with the upper rail 11 shift in such a way that the plate 21 on the right rests with its teeth against the opposite edge areas 44 of the slots 14 in the lower rail, as shown in FIG. 7. The center locking part still lies, as before, under the slots.

The locking plate 21 on the left has deformed the slit-like openings in the upper rail. At the same time, the guide pin itself has also been bent. All of the force has been absorbed by this locking part.

Because receiving spaces 42 are provided between the slit-like openings 16, the edge areas 45 are weakened, and it is possible for deformation to occur. Deformation also occurs in the guide pin 23. Otherwise, the rails, especially the lower rail 12, remain unchanged. As a result of this deformation, the impact to which the seat has been subjected is almost completely damped; that is, the peak load has been reduced. An impact of this type could occur, for example, when a vehicle collides with another vehicle. The seat is still traveling at the original velocity, however, as a result of which the slit-like openings of the upper rail are deformed, as can be seen in the drawing. It should also be explained here that the three locking plates and the edge areas of the openings cooperate to form a continuous line along which the forces can flow, which means that forces can be absorbed by each edge area, the end effect being to guarantee that the seat is held in place.

Here, too, it should be added that the teeth of the locking plate on the left remain in their position. Only the guide pin 23 is bent by the force of the upper rail 11, and the two other plates are merely shifted in such a way that the plate on the right, as already mentioned, is pushed to the left in the tooth-like slots 14, whereas the middle plate is still to be found, as before, underneath the slots.

The distance between the plates is kept constant by the edge areas 44, 45. In conclusion, it should also be mentioned that the receiving spaces for the plastified, that is, permanently deformed, edge areas can be designed in various ways.

Figure 8:
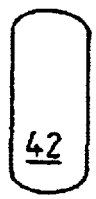
FIGS. 8–11 show various outlines of receiving spaces.
Figure 9:
Figure 10:
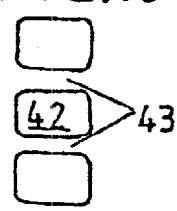
Figure 11:

In the case of FIG. 8, the space is shown in the form of a slot-like opening. In FIG. 9, each of the two long sides of the receiving space curves inward. In FIG. 10, the receiving space has two transverse webs, and in FIG. 11 it has a transverse web.

As already mentioned, the illustrated embodiments represent examples of ways in which the invention can be realized. The invention is not limited to them. On the contrary, there are many other types of modifications and applications which are possible. Instead of three locking plates, the locking part could also consist of four individual plates. Instead of the individual large receiving spaces, furthermore, it would also be possible to provide a plurality of holes between the slit-like openings. The important point is that the edge areas of an opening remain relatively thick but are able to undergo permanent deformation when a severe load is imposed.

List of Reference Numbers

10 pair of rails
11 upper rail
12 lower rail
13 operating element
14 tooth-like slot
15 teeth of 21
16 slit-like opening in 11
18 center web of 11
19 bent section of 11
20 free end of 23
21 locking part
22 opening in 18
23 guide pin
25 restoring spring
26 hook-shaped end of the spring
33 ball
40 U-shaped section of 11
41 U-shaped section of 12
42 receiving space between openings 16
43 transverse web in 42
44 edge area of 14
45 edge area of 16

What is claimed is:

1. A longitudinal seat adjustment for a seat of a motor vehicle, the seat adjustment comprising:

two pairs (10) of rails arranged a certain distance apart from one another, wherein the two pairs (10) are comprised of a U-shaped upper rail (11) and a U-shaped lower rail (12), respectively, wherein the upper rail (11) is adapted to be connected to the seat and the lower rail (12) is adapted to be connected to a floor of the vehicle;

wherein the upper and lower rails (11, 12) have U-shaped sections (40, 41) formed on sidepieces of the upper and lower rails (11, 12) and extending in a longitudinal direction of the upper and lower rails (11, 12);

wherein the U-shaped section (41) of the lower rail (12) is positioned in an interior space of the lower rail (12);

wherein the U-shaped section (40) of the upper rail (11) is positioned outside of a contour of the upper rail (11);

wherein the two pairs (10) comprise at least one movable, plate-shaped locking part (21), respectively, wherein the at least locking part (21) is supported on the upper rail (11), respectively;

wherein the at least one locking part (21) prevents, when in a locking position, the upper rail (11) from moving relative to the lower rail (12);

wherein a free edge of the U-shaped section (41) of the lower rail (12) is provided with tooth-shaped slots (14);

wherein the U-shaped section (40) of the upper rail (11) is provided on a sidepiece of the upper rail (11) and wherein the sidepiece provided with the U-shaped section (40) has slit-shaped openings (16);

wherein the at least one locking part (21) has teeth (15) engaging the tooth-shaped slots (14) and the slit-shaped openings (16);

an actuating element (13) connected to the at least one locking part (21);

a spring (25) acting on the at least one locking part (21);

wherein the actuating element (13) is adapted to move the at least one locking part (21) against a force of the spring (25) from a locking position into a release position;

wherein the at least one locking part comprises locking plates (21) and wherein at least two of the locking plates, when the locking part is in the locking position, are simultaneously arranged in a load-absorbing path of forces passing through the U-shaped section of the upper rail (11);

wherein edge areas (44) of the tooth-shaped slots (14) and/or edge areas (45) of the slit-like openings (16) are configured to be permanently deformable, wherein the teeth (15) of the at least one locking part (21) engaging the slit-shaped openings (16) and the tooth-shaped slots (14), when in the locking position, cause a permanent deformation of the edge areas (44) of the tooth-shaped slots (14) and/or the edge areas (45) of the slit-shaped openings (16) when a heavy load is applied such that a plastifying effect of the permanent deformation hardly changes a contact angle of the locking plates (21) relative to the edge areas (44) of the tooth-shaped slots (14) and/or the edge areas (45) of the slit-like openings (16).

2. The longitudinal seat adjustment according to claim 1, wherein, to allow the permanent deformation, a cross section of the sidepieces provided with the tooth-shaped slots (14) or the slit-shaped openings (16) is weakened.

3. The longitudinal seat adjustment according to claim 1, wherein the upper and lower rails have receiving spaces (42), respectively, arranged on both sides of the slit-like openings (16) or tooth-shaped slots (14) and wherein deformed edges (45) of the slit-like openings (16) caused by the permanent deformation move into the receiving spaces (42).

4. The longitudinal seat adjustment according to claim 3, wherein the receiving spaces (42) have a slot shape.

5. The longitudinal seat adjustment according to claim 3, wherein the receiving spaces (42) have an hourglass shape.

6. The longitudinal seat adjustment according to claim 3, wherein the receiving spaces (42) are divided by a transverse web (43).

7. The longitudinal seat adjustment according to claim 3, wherein the receiving spaces (42) are divided by a diagonal web.

8. The longitudinal seat adjustment according to claim 1, wherein the permament deformation occurs targeted when an extreme load occurs.

9. The longitudinal seat adjustment according to claim 1, wherein the at least one locking part (21) is divided into at least three individual ones of the locking plates (21), wherein the teeth (15) are arranged on the locking plates (21) along two opposite sides of the locking plates (21).

10. The longitudinal seat adjustment according to claim 1, wherein a width of the tooth-shaped slots (14) is greater than a width of the slit-like openings (16), wherein a width of the slit-like openings (16) is slightly larger than a width of the teeth (15) of the locking plates (21).

* * * * *